United States Patent

Paquette et al.

[11] 3,775,209
[45] Nov. 27, 1973

[54] NON-WOVEN ARTICLES MADE FROM CONTINUOUS FILAMENTS COATED WITH DISCRETE DROPLETS

[75] Inventors: Elmer Gordon Paquette, Madison; Karl R. Guenther, Stoughton, both of Wis.

[73] Assignee: Bjorksten Research Laboratories, Inc., Madison, Wis.

[22] Filed: Oct. 13, 1971

[21] Appl. No.: 188,750

Related U.S. Application Data

[63] Continuation-in-part of Ser. No. 876,005, Nov. 12, 1969, Pat. No. 3,616,002.

[52] U.S. Cl. ................ 156/181, 28/75 R, 156/178, 161/175
[51] Int. Cl. ............................................ D04h 3/12
[58] Field of Search .................. 156/180, 181, 176, 156/177, 178; 161/175

[56] References Cited
UNITED STATES PATENTS
3,220,904  11/1965  Touey et al. .................. 156/180 X
3,313,665   4/1967  Berger .............................. 156/180
3,423,266   1/1969  Davies et al. .................. 158/181 X
3,513,049   5/1970  Marzocchi ........................ 156/180

Primary Examiner—Edward G. Whitby
Attorney—Johan Bjorksten

[57] ABSTRACT

Non-woven articles, including garments and porous sheet materials, are made from continuous filaments coated with discrete droplets of binder. In the past, non-woven products have suffered the handicap of a stiff and "boardy" feel. We eject continuous yarn or filaments in an air space and contact them with binder droplets while still suspended in air, so that the droplets dry sufficiently to become non-migrating before they are deposited on the screen or mold on which the fibers are brought into contact with each other and bonding takes place. This method is particularly suitable for making garments of elastomeric fibers, not easily handled in ordinary production machinery. Another generally applicable advantage is that the resultant products are exceptionally flexible and that the articles produced do not split into stratified binder-rich and-poor areas, but are uniformly bonded throughout.

5 Claims, 8 Drawing Figures

PATENTED NOV 27 1973 3,775,209

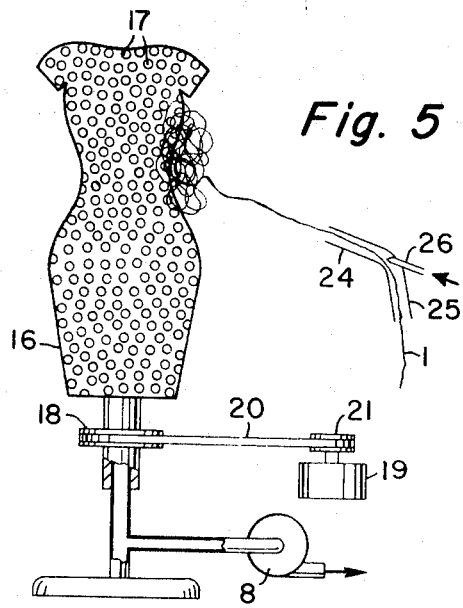
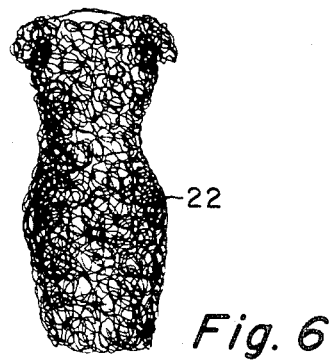
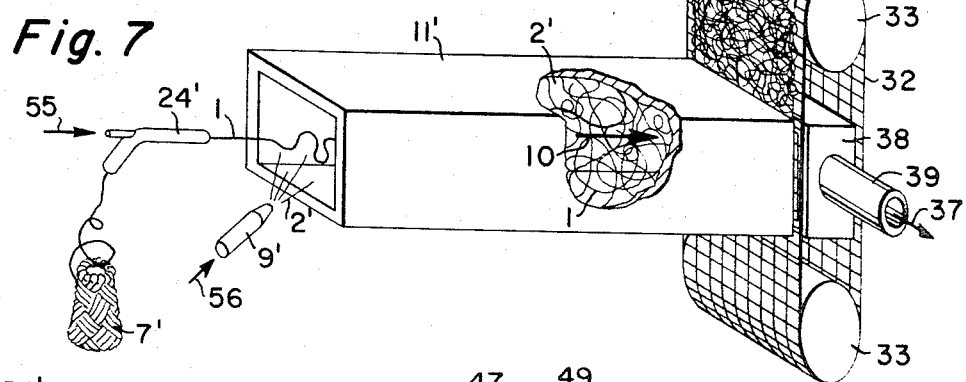
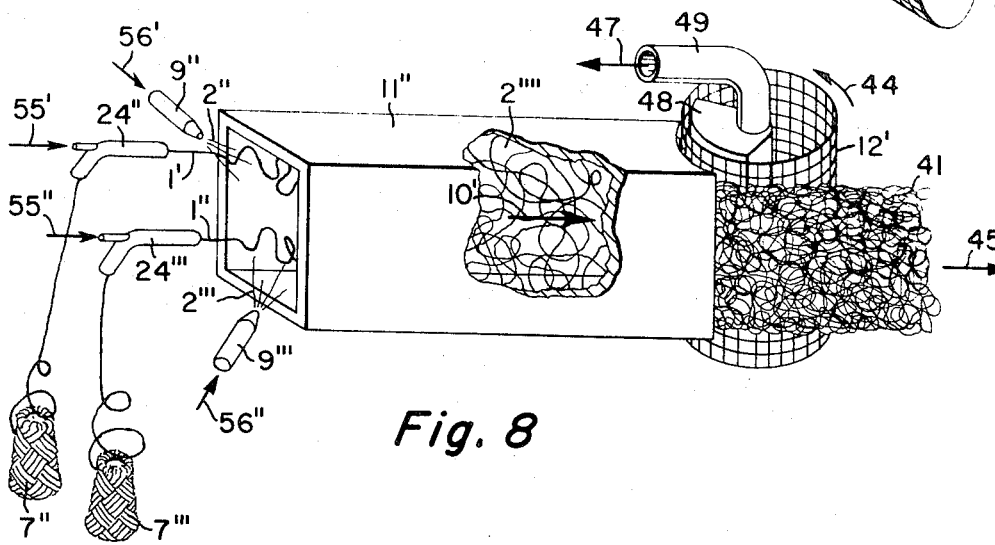
Fig. 5
Fig. 6
Fig. 7
Fig. 8

NON-WOVEN ARTICLES MADE FROM CONTINUOUS FILAMENTS COATED WITH DISCRETE DROPLETS

CROSS-REFERENCES

This application is a continuation-in-part of application Ser. No. 876,005, filed Nov. 12, 1969, now U.S. Pat. No. 3,616,002 entitled NON-WOVEN ARTICLES MADE FROM CONTINUOUS FILAMENTS and deals with a modification of the previously described invention whereby relatively rapid production methods are made possible.

FIELD

This invention relates to non-woven fibrous products and the manufacture thereof and has as its principal object an improved and more rapid method for producing garments and non-woven fabrics than is described in the cross-referenced application.

1. Statement of Scope

This invention relates to non-woven fibrous products and to manufacture thereof, and has for principal objects a method to product comfortable and attractive garments without the use of sewing techniques, and also the production of soft and non-boardy non-woven fabrics.

2. Statement of Prior Art

Various methods have been used for producing preforms for subsequent impregnation with hardening resins to form automotive parts, boats and the like. These have included spraying glass roving onto perforated suction plates, and subsequent impregnation with resin, for example by means of suction, pressing and centrifugal casting. It is also known to make hats from felted fibers molded on forms, and set by resinous binders. Such methods have been used also with fibers to form non-woven textiles.

The difficulty heretofore encountered in producing such textiles, is that the binder customarily applied in a solution and subsequently dried during the drying process will migrate to the periphery, where the evaporation is most rapid. As a result, the binder is enriched on the surface of the web, resulting in stiffness, while the center portion thereof is starved on resin and easily parts or delaminates. It has been attempted to remedy this by applying the binder in solid form, by dusting or mixing throughout the fiber mass, but this procedure is far less rapid and convenient, and a significant portion of the binder material is wasted because it is either not lodged at crossover points of fibers, which by capillary forces selectively attract liquid binders, or they provide an excess of binder, suitable for stiff products such as shoulder pads, but undesirable for garments generally.

STATEMENT OF OBJECTIVES

An object of this invention is a bulky fabric or mat in which the binder is uniformly distributed throughout the fabric.

Another object is a method for producing fabrics or mats in which the binder is uniformly distributed throughout the structure.

Another object is a process for making a soft and pliable non-woven article, in which particles are deposited upon fibers uniformly from all sides, while such fibers are suspended in a gaseous medium, so as to form discrete particles thereon, said particles having a viscosity higher than 100 centipoise as deposited.

Another object is a process for making a uniform non-woven article in which the binder is in solution in a volatile solvent, said binder being applied, and said solvent substantially removed, while said fibers are suspended in a gaseous medium in only minimal contact with each other.

Further objects will become apparent as the following detailed description proceeds.

SHORT STATEMENT OF THE INVENTION

In accordance with our invention, we suspend continuous filaments in a gaseous medium, we apply a binder comprising a volatile solvent and essentially remove said solvent while the filaments still remain suspended with the fibers essentially free from contact with each other. We are using the word "filament" in a broad sense to include any flexible tensile strands, of essentially unlimited length, including also such strands or yarns as are made of a multiplicity of shorter fibers, such as for example staple yarns or cotton or woolen yarns. In this fashion, the stiffening of the binder prior to bringing the fibers into close contact with each other precludes further movement of the binder, particularly the migration which until now has greatly impaired the non-woven fabrics.

When the binder is applied so as to form tiny droplets on the fiber surfaces, migration is impeded by evaporation while the fibers are still floating in the gaseous envelope, substantially unrestrained by contact with each other. An additional advantage is gained in that those parts of the fibers which are free from resin retain their original suppleness and flexibility, so that the resultant product does not have the "boardy hand" or stiffness which until now has generally characterized non-woven fabrics.

THE DRAWINGS

The invention is further described with reference to the drawings wherein like reference numerals refer to like parts and:

FIG. 5 is an elevation of the application of the invention to production of a garment;

FIG. 6 is an elevation of the product of the step of FIG. 5;

FIG. 7 is a schematic partially cut away perspective view of the modification of the embodiment of FIG. 3;

FIG. 8 is a schematic partially cut away perspective view of a modification of the embodiment of FIG. 3.

Figure 1:
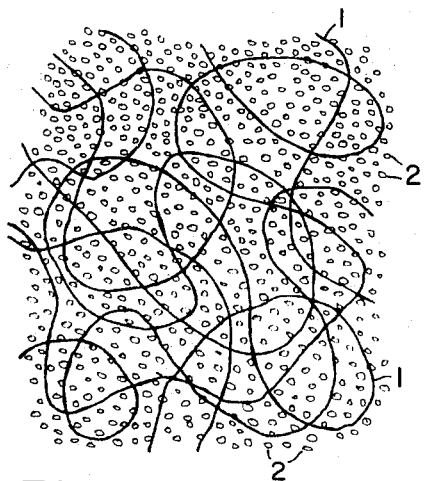
FIG. 1 is a schematic enlarged view of the coating step.
Figure 2:
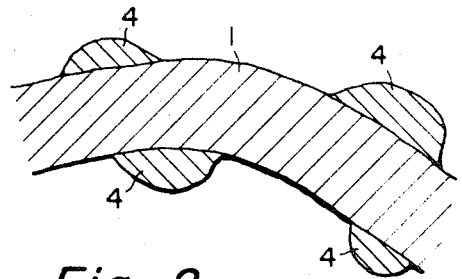
FIG. 2 is a schematic much enlarged view of binder on a fiber.
Figure 3:
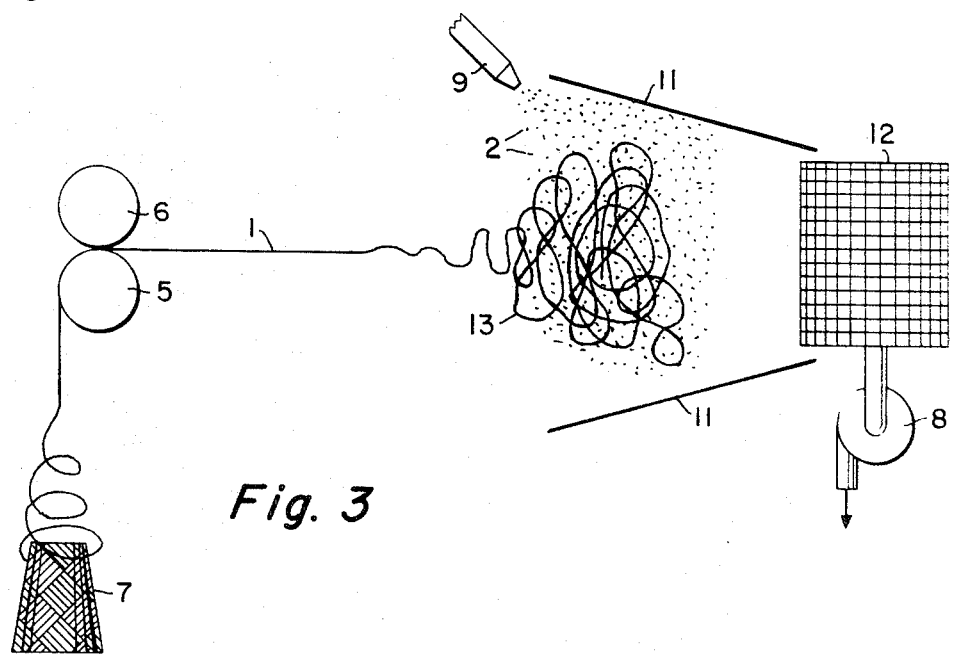
FIG. 3 is a schematic elevation.

Referring now to FIG. 3, 7 is a fiber supply such as a pirn or roll of a continuous fiber, 5 and 6 are projection means, in this case a pair of rollers 5 and 6, which rotate so as to advance the fiber, of which there may be many, so as to impart to them a velocity in the range of 60 to 10,000 ft/min. and preferably 500 to 5,000 ft/min. The projected fiber is continually projected at high speed, but removed at a much lower rate, it will curl up in a three dimensional pattern of loops and tortuosities 13.

This pattern is relatively slowly drawn onto a moving screen 12, through which some air is being drawn by a suction means 8, so as to deposit the said three dimensional pattern onto said screen and remove it from the space in which it was formed.

Figure 4:
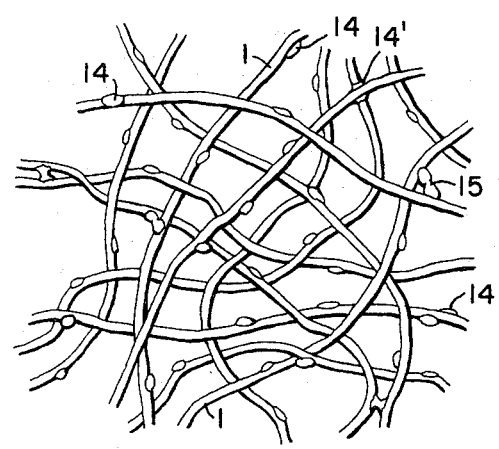
FIG. 4 is an enlarged fragmentary view of the product.

While this tortuous pattern 13 is relatively stationary or moving at a speed not greatly different from the speed of the air surrounding it, it is dwelling in a cloud of small droplets, 2, of a binder composition, sprayed onto it by a nozzle 9. The space in which the fiber pattern 13 and the droplets of binder are present is confined by walls 11 so that spreading of the binder droplet beyond the confines of said space is limited, and the distribution of binder droplets within said space is substantially uniform.

FIG. 1 shows the fibrous loops 1 suspended in a gaseous ambient, together with suspended droplets of binder 2. The droplets adhere to the fibers where they contact the fibers. The droplets will preferably become attached to the fibers as discrete particles 4 as shown in FIG. 2. The dwell in the gaseous ambient is preferably sufficiently long to evaporate enough of the solvent originally present to ensure that the binder will congeal in a kinetically stable state, whereby we mean a condition in which the droplets will not respond to capillary spreading forces, but will stay put on the fiber, substantially without further migration or displacement from their positions on said fiber.

Thus, the binder becomes fixed onto the fibers as droplets which resist further motion, before the fibers are brought in any extensive contact with each other.

When the placement and kinetic stabilization of the binder on the fiber has taken place, the fibers are carried by air currents or gravity or a combination of both onto a moving screen or belt, where the fibers contact each other, and are bound together at the point where binder contact is effected, for example where a binder droplet on one fiber contacts a binder droplet on another, or at least a receptive, adherable spot on the other, to which said binder droplet can become firmly attached. The resultant structure is shown in FIG. 4 which illustrates a web made by compacting fibers such as those in FIG. 2, wherein a point where bonding between fibers has been accomplished by the union of two droplets 14 is indicated at 15 and a point where bonding is accomplished by a single droplet 14 is shown at 14'. Since the major portion of the fibers is free from binder, these fibers retain their original softness and suppleness, and are free from the poor "hand" or boardy feel that usually is associated with non-woven structures.

Referring to FIG. 5, 16 is a mold for a lady's garment. This mold is covered over its entire surface with perforations 17, into which air is sucked continually by means of air moving means 8 which exhaust the air from the hollow interior of mold 16 so as to create a continual suction through the perforations. A continuous fiber 1, in this case a 400 Denier woolen yarn, was projected toward the form by projection means which in this case are an air gun consisting of a tube 24, into which is fed at the distal end 25 the fiber to be projected onto the mold, and an air supply tube 26 into which air is fed to propel the fiber at high velocity. In the present case, the inner diameter of the said tube was five thirty-seconds inch, of the air supply tube was one-sixteenth inch and the air pressure used was 40 psi. The yarn was ejected at a rate of 1,500 ft/min. Simultaneously a binder having the following composition: 48–49 percent polyvinyl acetate copolymer in $H_2O$ - particle size 0.15 microns, was sprayed at 100 psi thru a fogging nozzle into the area of tortuous suspended fiber so as to form rapidly drying discrete droplets of binder thereon, which when the fiber reached the mold, were already dried to the point of being fixed in their positions and non-migrating. Pulley 12 attached to the base of the mold may be made to revolve continually by belt 20 which may be trained over pulley 18 and pulley 21 which may be driven by motor 19.

The air gun is moved by hand or by a programmable holder, so as to deposit the fiber at the desired rate. Often we prefer to spray a second reinforcing fiber, such as Nylon, "Dacron" or a high strength cellulose such as "Fortisan" onto the areas where particular reinforcement is desired, that is, where the rate of wear is accentuated in use.

The binder was caused to set by exposing the mold with fiber layer to a temperature of 320°F while compressing it with a rubber roller by hand. We may also use inflatable balloons of a silcon rubber expanded within a small enclosure containing the mold to exert pressure to cause increased contact and bonding between fibers, or between different parts of the same fiber.

Upon completion, the finished garment was extended so as to slip over the protruding parts of the mold, and removed for use.

The completed garment 22, is shown in FIG. 6.

Referring now to FIG. 7 there is shown an embodiment of the process and apparatus of the invention wherein the product 31, a non-woven web of firmly bonded whorled loops and random fiber configurations may be produced relatively rapidly but nonetheless providing sufficient time for droplets of binder to settle from a fog of binder droplets onto whorled and looped configurations of strand 1. Duct member 11' may correspond to member 11 in FIG. 3 but may be made relatively long as shown. Fiber or strand 1 may be introduced from pirn 7' into the interior of duct 11' by air gun 24' into which air may be introduced as indicated by arrow 5. Resin 2' may be introduced into the interior of member 11' by nozzle or gun 9' into which air may be introduced as indicated by arrow 6. Gun 24' may correspond to the air gun of FIG. 5 and nozzle or gun 9' may correspond to nozzle or gun 9 of FIG. 3. Resin 2', thus so introduced into 11' to form a fog of substantially invisible droplets of binder as indicated at 2' and strand 1, formed into convoluted configurations as in other embodiments, are shown in the cutaway portion of member 11'.

In contradistinction to other embodiments, the convolutions of strand 1 and the fog of binder 2' may be caused to travel relatively rapidly through member 11' in the direction and in the manner indicated by arrow 10. Although travel of the fog and strand may be relatively rapid, a suitable period of time may be provided for droplets of binder to settle out from the fog onto strand 1 by making member 11' relatively long.

Endless apertured belt 32 is provided adjacent to the opposite end of member 11' from gun 24'. Belt 32 may be trained over rollers 33 to operate in the direction indicated by arrow 34. Plenum 38 may be disposed on the inner side of belt 32 opposite the adjacent end of member 11' and air may be withdrawn from plenum 38 through duct 39 as indicated by arrow 37 to provide reduced pressure in plenum 38 and provide a flow of air through member 11' and thence through belt 32 into plenum 38 to cause strands 1 to be deposited upon belt 32 to provide product 31. While strand 1 is carried on belt 32, bonding may be caused or allowed to take place as indicated in FIG. 4 whereupon products 31 may be removed from belt 32 as indicated by arrow 35.

In FIG. 8 there is shown a modification of the embodiment of FIG. 7 wherein ducts 11'' may correspond to duct or member 11'. Two different fibers 1' and 1'' may be introduced thereinto from pirns 7'' and 7' by operation of ejecting apparatus 24'' and 24' into which air is introduced as indicated by arrows 55' and 55'' respectively. Likewise two different resins or a greater amount of resin may be introduced from nozzles or guns 9'' and 9' by introduction of air into the nozzles or guns as indicated by arrows 56' and 56'' to provide for introduction of resin as indicated at 2'' and 2''' to provide a fog of resin droplets within member 11'' which may be as indicated at 2'''', the droplets being substantially invisible to the naked eye. The fog and the whorled convolutions of strands 1' and 1'' shown in the cutaway portion of member 11'' may travel relatively rapidly as indicated by arrow 10' in the direction indicated by arrow 10' and sufficient time may be provided for deposition of droplets of binder on the whorled configurations of strands by making member 11'' of suitable length. Apperturated rotating drum 12' may be located adjacent to the end of member 11'' which is opposite from the end into which fiber and resin is introduced. Drum 12' may correspond to drum 12 of FIG. 3. A plenum 48 may be provided in the interior drum 12', disposed opposite the downstream end of member 11''. Air may be withdrawn therefrom through duct 49 as indicated by arrow 47 to provide a flow of air from member 11'' thorugh the apertures of drum 12' and thence into plenum 48 whereby strands fibers 1' and 1'' are deposited upon drum 12' and bonding takes place as indicated in FIG. 4 to provide the non-woven product of the invention as indicated at 41 which may be removed from the drum in the direction indicated by arrow 45.

EXAMPLES

The invention is further illustrated by the following specific examples:

EXAMPLE 1

A thread of 480 denier continuous filament Nylon was projected into an air space by means of the device shown in FIG. 3 and described above. The rate of projection was 3,000 ft/min. The rollers 5 and 6 were made of rubber molded over a metal insert and driven by a one-fifteenth HP motor. The thread lost its initial velocity due to air resistance about 2 feet from the point of projection and became nearly stationary in the air, slowly falling toward the screen 12. This was somewhat facilitated by a slow air current being sucked through this screen at a rate of 75 CFM.

Simultaneously we injected into the air space occupied by the fiber an atomized spray of a binder having the following composition: Piolon T-211 (Pioneer Chemical Works) diluted to 75 percent by volume with acetone. This binder was sprayed into said volume of air occupied by the fiber, by means of a spraying device in which the binder was supplied at a pressure of 1,500 PSI, and projected against a deflector, so as to break it up into droplets having an average diameter of 40 to 124 microns, and preferably 26 to 60 microns. These droplets filled the same space as the thread coils, and became attached to said thread, in a substantially uniform fashion. During this process, they lost solvent by evaporation, to such a degree that they became fixed and non-migrating.

The calculated dwell time of the thread coils and convolutions in the fog of binder droplets was on the order of 1.6 seconds.

The fiber and binder combination was then pulled and/or gravitated to the screen 12, where the fibers became compacted by increasing the air flow to 10,000 CFM and brought into intimate adhesive interaction with each other so as to form a coherent firmly bonded web. The density of this web could be increased by compression between rollers to which the binder in its state at the point was non-adherent, such as poly tetrafluoro ethane ("Tefflon") coated rollers.

The resultant web was pliable and very strong. It showed no sign of stratification or binder migration.

EXAMPLE 2

A 0.70 Denier Nylon yarn was sprayed by suitable means for projecting this yarn continuously, such as the device shown and described above in conjunction with FIG. 3, onto a receiving means consisting essentially of a flat 14 mesh screen thru which air was being sucked at a speed of about 300 CFM. A binder solution consisting of 2.5 percent of a polyamide such as DuPont Elvamide 8061 in methanol was simultaneously sprayed on, at a density of 2 gr/ft$^2$. Upon evaporation of the methanol, the binder caused the filaments to form adhesions at cross-over points so as to form a coherent article. The resultant non-woven fabric was pressed between sheets of 14 mesh screen at 25 psi and 320°F for 2 minutes and cooled under the same pressure for 5 minutes. The average bending length of three samples was 10.5 cm. and the average breaking strength of three 1-inch wide samples was 34.8 lbs. Thus the breaking strength to bending lengths ratio was 3.32.

Extraction of the samples with boiling methanol indicated that the binder content was 30.1 percent.

A similar sample was prepared by putting an air laid batt of chopped 3 denier nylon staple fibers 2 inches in length, with a 5 percent solution of Elvamide 8061 in methanol, drying at 70°C, and pressed at 25 psi for 2 min. at 320°F between pieces of 14 mesh screen and cooled for 5 minutes under the same pressure. The bending length of this sample was 9.8 cm. and the breaking strength 18.5 lbs. Thus the breaking strength to bending length ratio of this material was 1.89 or 57 percent of that prepared from the continuous yarn. The calculated dwell time of the convolutions of fiber in the fog of binder was on the order of 0.4 seconds to 0.8 seconds.

EXAMPLE 3

A 70 Denier Nylon yarn was projected onto a shaped 14 mesh evacuated screen as indicated in FIG. 5 while simultaneously spraying with a binder solution consisting of 2.5 percent "DuPont Elvamide 8061" in methanol. The molded article was removed from the screen and retained its shape as shown in FIG. 6.

The advantages of this invention are illustrated by the following comparative measurements of breaking strength.

When non-woven fabrics are produced from batts of chopped fibers via the application of a binder such as Elvamide 8061, the breaking strength of the fabric drops markedly when the binder content is reduced from a level of 31.7 to a level of 25.1 percent. With fabrics produced with the same binder via the use of a continuous yarn, there is no loss in strength even when the binder content is reduced from a level of 30.1 to a level of 17.2 percent.

Furthermore, at comparable levels of binder, i.e., 30.1 percent and 31.7 percent the fabric produced from the continuous yarn had 1.9 times the strength of the fabric produced from chopped fibers.

The data substantiating these conclusions is shown in the following table:

Effect of Binder Concentration on the Breaking Strength of Non-Woven Fabrics Produced with Chopped Nylon Fibers and Continuous Yarns

| Fiber Form | % Elvamide 8061 | Breaking Strength of 1" Wide Sample lb. |
|---|---|---|
| Chopped | 31.7 | 18.5 |
| Chopped | 25.1 | 8.9 |
| Continuous Yarn | 30.1 | 34.8 |
| Continuous Yarn | 17.2 | 35.3 |

EXAMPLE 4

An acrylic latex containing 50 percent solids in water and known as "Ucar 891" (Union Carbide) was diluted with an equal weight of acetone, and sprayed with an airless vibration sprayer known as "Jiffy Electric Sprayer," made by Astro Products Co., Branford, Conn. The following fibers were projected simultaneously with the above into the fog of acrylate droplets at the rate of 1,000 ft/min: in sequence, 200 Denier crimped Nylon; 30-20-RO2-56 duPont Dacron; a 50-10-S-280-SD (duPont).

Micrographs taken of the resultant webs showed unmistakably the deposition of the fibers of discrete, separate beads of the resin, sometimes bridging and bonding fibers together, but always separated by stretches of fiber free from any visible coating.

In producing these webs, we varied the air suction in the range 3,000 to 10,000 cubic feet per minute, through a 20 × 40 inch screen. The thickness of the web produced in this example was from 0.01 to 1 inch. Cure was effected at 320°F, partly in a press at 25 psi, partly without pressure in oven. The indicated dwell time of the convoluted fibers in the fog of binder was perhaps as low as 0.0001 sec. in some instances.

EXAMPLE 5

A perforated hollow mold was connected with the suction intake of a blower having a capacity of 45 ft³/min., and was thereupon sprayed with an air gun consisting of a ⅛ inch diameter, 12 inch long tube having an inclined air inlet entering at 20° angle with the axis of said tube, while the intake end thereof was connected with a fiber spool as supply of 210 Denier fiber of the elastic polyurethane known to the trade as "Lycra" and made by E. I. duPont de Nemours & Co. Simultaneously, we sprayed into the space in which the tortuous loops were formed, prior to reaching the mold, a binder of the following composition: Urethane Latex, Type X-1042, 50.2 percent solids in water.

The dwell time in the air of the tortuous loops was approximately 2 seconds. On striking the form, more than half of the solvent originally present had evaporated, and the residual material had a viscosity estimated at approximately 1,000 centipoise, which was sufficiently high to prevent any further migration of the binder on or along the fibers. On further drying for minutes at a temperature of 300°F, the fibers were permanently joined to provide an attractive dress, snugly fitting the form on which it was made, readily strippable therefrom because of the elasticity of the fibers used as well as because of the flexibility and extensibility of the random pattern.

Following the general procedure of Example 2, we also made non-woven fabrics 800 Denier crimped Nylon, projected onto a steel screen of 5/32 inch diameter holes on 3/16 inch staggered centers. The binder concurrently applied was "Flexbond 330" (Airco Chemicals & Plactics Co.) diluted with 75 percent of its volume by weight of methanol.

70 Denier ("Spandex" duPont "Lycra") was projected onto a window screen and simultaneously sprayed with "Urethane Latex X-1042" (Wyandotte Chemicals Corp.) diluted with 70 percent by volume of n-butyl acetate; 7-1-0-280-sd Nylon monofilament (duPont) was sprayed similarly onto 10 mesh window screen and simultaneously sprayed with "Polyco 2114" (Borden Chemical Co.) diluted 65 percent by volume with acetone. "70-34-RO-56" polyester yarn (duPont "Dacron") was projected onto a 10 mesh screen while simultaneously spraying as a binder "Hycar 2671" (B.F. Goodrich Chemical Co.) diluted 70 percent by volume with acetone.

All of these procedures resulted in attractive fabrics or mats of much improved softness over corresponding products made according to prior art.

While the above examples illustrate some of the embodiments of the invention, it is evident that the scope is substantial. The fabrics of the invention have a thickness generally higher than 0.007 inch, as below this level the plasticizer migration due to flow of the binder during the drying step is not accentuated, and most strongly applies to fabrics having a thickness range from 0.010 inches to 0.600 inches.

The present invention is particularly valuable in the fabrication of garments from fibers so elastic that they cannot be handled at normal production speeds on a knitting machine or on weaving equipment. Thus, the invention is particularly applicable to fibers having a rubberlike character, the elasticity being generally characterized by anfully reversible elongation of more than 100 percent.

The resultant products are characterized by the absence of the previously prevalent migration of binder to the outer layers in the drying process. Thus, the central layers of the fabrics of the inventions are substantially indistinguishable from the outer layers on the basis of binder concentration, boardiness, stiffness and bonding strength, and the fabrics do not tend to part along planes of stratification when pulled apart by force applied perpendicularly to a flat surface.

The particles of the binder projected as a fog have a viscosity which at the time they become attached to the fibers, and these are allowed to aggregate, is sufficient to prevent capillary migration. This is generally a viscosity higher than 1,000 centipoise. To retain the ability to bind, there should be still some cohesive tendency. The upper limit of viscosity at the bonding step is generally about $10^5$, however, this is more readily adjusted and can be reached for example by application of heat in the bonding process, so as to effect adhesion when the adhesive at room temperature has hardened to a point where adhesiveness had all but vanished.

We prefer to employ binders in which the particles of the fog when sprayed comprise 10 to 50 percent of solid, 5–15 percent of a liquid solvent therefore which has a boiling range substantially between 75° and 120°C and 55–75 percent having a boiling range substantially between 37° and 48°C.

We contemplate a structure of continuous filaments which have distributed substantially uniformly on their surface discrete, non-connected droplets of adherent resinous or polymeric material. The droplets in question are in the finished article substantially dry to the touch, but have been made to form bridges or points of adhesion between the fibers where they touch two fibers, or droplets on another fiber usually at intersections of the fibers or filaments, or where these touch or almost touch each other. The bonding may have been effected at a stage of the process when the droplets were not yet quite dry to the touch, but yet dry enough to resist any capillary forces which might cause excessive spreading or migration.

The fibers or yarns sprayed in this process are practically endless so that they can be sprayed through the projection means as a continuous stream of connected matter. So long as this is possible, it does not matter greatly if a continuous yarn is made of continuous filament, or by spinning staple fiber, or natural fibers such as cotton, jute or wool.

The particularly preferred fibers are those which cannot otherwise be made into elastic knit structures, such as fibers or yarns of rubber, or of elastic polyacrylates, or elastomeric polyurethanes having elastic extensibility in excess of 100 percent, such as "Lycra." The invention is applicable to fibers of the synthetic thermoplastics, such as "Nylon," polyethylene glycol terophthalate, polyvinyl fluoride, split film fibers, for example of polypropylene, polyolefin fibers generally, polyphenoxide fibers, polyoxymethylene, also to fibers extruded or drawn as thermoplastic but subsequently cross-linked, chemically or by exposure to ionizing radiation, and which may even decompose before melting, polyacrylate or methacrylate fibers, and the like, including also fibers not yet invented but of substantially equivalent mechanical properties to the above.

While the binder compositions are preferably solutions, when rapid spraying and drying is desired, we may also in some cases employ water latices. When these are sprayed, we prefer to maintain the mold at a temperature of about 180°–230°F, in order to enhance the rate of evaporation. Suitable latices are, for example:

"Ucar 891" — Union Carbide, Inc.

"Urethane Latex, Type X-1042" — Wyandotte Chemical Corporation

"Flexbond 330" — Airco Chemicals & Plastics, Inc.

The water latices are preferably used with slit film type of fibers having a width of at least 15 microns, or with fast drying synthetic monofilaments.

With "kinetic stability" we means stability to capillary and other surface forces, so that a droplet or film deposited will stay put when the fiber is deposited on the mold or where its final bonding takes place, and will not then further spread or migrate so as to change the distribution or concentration thereof.

With "contact points" we mean those points on the fibers where they come in contact with another fiber, or another part of the same fiber so that bonding can be effected.

In accelerating the fiber to project it into the gaseous ambient in which it is contacted by the binder fog, it is desirable to give the continuous filament or yarn a velocity of at least 60 ft/min and to decelerate it to at least half its initial velocity by contact with the air into which it is projected, so as to induce the formation of the tortuous or curvilinear patterns described. The preferred fiber velocity is from 300 ft/min to 30,000 ft/min. The rate of air motion through the preform mold is in the order of 30 feet up to 100,000 ft/min., and preferably about 50–5,000 ft/min. The calculated dwell time of the tortuous configurations of fiber in the fog of binder droplets may be from 4 seconds or greater to 0.024 second or less. The speed can be accelerated as described in connection with FIGS. 7 and 8 and we generally prefer to use steady and continuous operating conditions.

Having thus disclosed our invention, we claim:

1. The process for producing a non-woven structure which comprises the step of spraying into a gaseous ambient a solvent containing resinous binder medium so as to form a fog of substantially suspended droplets in said ambient, projecting into said fog and ambient continuous filaments so as to form semi-static randomly looped three dimensional configurations within said fog, providing a receiving means, causing said ambient, said fog and said configurations to move at a relatively high rate with respect to said receiving means toward said receiving means while being semi-static with respect one to another, maintaining said randomly looped three dimensional configurations within said fog to cause discrete droplets of said fog to deposit on thus configured filaments as discrete droplets during said movement, evaporating a portion of said solvent from said discrete droplets during said movement to increase the viscosity of said droplets and substantially prevent migration of said droplets, then depositing the configurations of said filaments on said receiving means and evaporating the residual liquid from the droplets on the filaments so as to cause the filaments to adhere to each other at droplet-to-droplet and droplet-to-filament points of contact.

2. The process of claim 1, in which the particles of said fog have a vsicosity in excess of $10^3$ centipoise, and below $10^5$ centipoise.

3. The process of claim 1, in which the particles of said fog comprise 10–50 percent solid, 5–15 percent of a liquid solvent therefore which has a boiling range substantially between 75°C and 120°C, and 75–55 percent of a solvent having a boiling range substantially between 37°C and 48°C.

4. The method of claim 1, wherein the step of projecting further comprises the step of suspending the filaments in the gaseous ambient.

5. The method of claim 1, wherein the gaseous ambient is a moving gaseous medium.

* * * * *